US009167127B2

(12) United States Patent
Takada et al.

(10) Patent No.: US 9,167,127 B2
(45) Date of Patent: Oct. 20, 2015

(54) PRINTING CONTROL DEVICE, PROGRAM, AND PRINTING METHOD

(71) Applicant: SEIKO EPSON CORPORATION, Tokyo (JP)

(72) Inventors: Katsuyuki Takada, Nagano (JP); Masahiro Komatsu, Nagano (JP); Iwane Ikeda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/476,284

(22) Filed: Sep. 3, 2014

(65) Prior Publication Data
US 2015/0116733 A1      Apr. 30, 2015

(30) Foreign Application Priority Data

Oct. 31, 2013   (JP) .................................. 2013-226555

(51) Int. Cl.
*H04N 1/32* (2006.01)
*B41J 2/01* (2006.01)
*H04N 1/00* (2006.01)
*H04N 1/40* (2006.01)

(52) U.S. Cl.
CPC .............. *H04N 1/32144* (2013.01); *B41J 2/01* (2013.01); *H04N 1/00244* (2013.01); *H04N 1/00347* (2013.01); *H04N 1/00408* (2013.01); *H04N 1/40068* (2013.01); *H04N 2201/0084* (2013.01); *H04N 2201/3269* (2013.01); *H04N 2201/3271* (2013.01)

(58) Field of Classification Search
USPC ......................................................... 358/1.2
See application file for complete search history.

(56) References Cited

U.S. PATENT DOCUMENTS

| 7,594,613 | B2 * | 9/2009 | Sato et al. ...................... 235/494 |
| 2009/0316199 | A1 * | 12/2009 | Yoshimura et al. .......... 358/1.15 |
| 2014/0009528 | A1 * | 1/2014 | Shimomura et al. ............ 347/20 |

FOREIGN PATENT DOCUMENTS

JP      2008-197968 A      8/2008

* cited by examiner

*Primary Examiner* — Ngon Nguyen
(74) *Attorney, Agent, or Firm* — Global IP Counselors, LLP (57) ABSTRACT

A printing control device, a program, and a printing method is provided for creating printed matter for which a user can easily identify a web page on which an image included in the printed matter is published. A printing control device accessible to a server for managing a web site through a network includes a specification receiving unit receiving specification of an image published on the web site, an image acquisition unit acquiring the specified image through the server, an access information acquisition unit acquiring access information for accessing a web page on which the image is published on the web site, a code information creation unit creating code information expressing the access information using text or an image, and a printing execution unit making a printer print a synthetic image in which the acquired image and the created code information are included.

7 Claims, 12 Drawing Sheets

PRINTING CONTROL DEVICE, PROGRAM, AND PRINTING METHOD

CROSS-REFERENCE TO RELATED APPLICATIONS

This application claims priority to Japanese Patent Application No. 2013-226555 filed on Oct. 31, 2013. The entire disclosure of Japanese Patent Application No. 2013-226555 is hereby incorporated herein by reference.

BACKGROUND

1. Technical Field

The present invention relates to a printing control device for acquiring images from a server that controls images, a program, and a printing method for printing the acquired images.

2. Related Art

From the past, web sites are known for which it is possible to browse images such as photographic images, text, and furthermore animation or the like. For example, on photo album sites or SNS (Social Network Service) sites on which a plurality of images are posted, it is possible to browse images posted on the web site by a user. With the web site, a server that manages the images is connected to a network, and by the user accessing the server, a request is made to browse images (see JP-A-2008-197968 (Patent Document 1), for example).

Also, there are cases when the user downloads an image posted on the web site, and creates printed matter using the downloaded image. For example, there are cases when the user prints the downloaded image on the face of a postcard, and sends to other users or the like.

SUMMARY

However, since there is no information on the printed matter indicating the location of the web page on which the image is published, even if the printed matter is received, another user cannot identify the web page on which the image can be browsed.

The present invention is conceived in light of the above-mentioned problem, and an advantage is to provide a printing control device, a program, and a printing method for creating printed matter for which the user can easily identify the web page on which the image included in the printed matter is published.

To solve the problems noted above, one aspect of the present invention is a printing control device accessible to a server for managing a web site through a network. The printing control device includes a specification receiving unit configured to receive specification of an image published on the web site, an image acquisition unit configured to acquire the specified image through the server, an access information acquisition unit configured to acquire access information for accessing a web page on which the image is published on the web site, a code information creation unit configured to create code information expressing the access information using text or an image, and a printing execution unit configured to make a printer print a synthetic image in which the acquired image and the created code information are included.

With the invention configured as noted above, when printing an image published on a web site using a printer, code information expressing the access information of the web page on which this image is published is printed. Because of that, the user is able to easily identify the web site on which the image is published based on this code information.

Code information can be any type of item as long as it makes it possible to identify the web site. For example, it can be a bar code which is one dimensional information, or a QR code (registered trademark) which is two dimensional information, or furthermore can also be a URL (Uniform Resource Locator).

Also, with one aspect of the present invention, it can also be configured such that the web site is configured to provide a first service of individually publishing the image, and a second service of doing batch publishing of a plurality of images including the image, and the access information acquisition unit is configured to acquire either access information of the first service or access information of the second service.

With the invention configured as noted above, it is possible to set the printed code information according to the type of service by which the image is published.

Also, with one aspect of the present invention, it can be configured to further include a reading unit configured to read the code information, and a code analysis unit configured to restore the access information based on the read code information, and configured to display the web page on which the image is published.

With the invention configured as noted above, it is possible to access the web page on which the image is published by reading the code information, so the user is able to easily browse the web page on which the image is published.

Furthermore, with one aspect of the present invention, it can also be configured such that the printing execution unit is configured to set a density of the code information printed on a first paper to be lower than a density of the code information printed on a second paper for which ink does not bleed as easily as the first paper.

With the invention configured as noted above, it is possible to suppress readability becoming poor due to bleeding of the printed code information.

Also, with one aspect of the present invention, it can also be configured such that the printing execution unit is configured to set a size of the code information printed on a third paper to be smaller than a size of the code information printed on a fourth paper for which ink bleeds easier than with the third paper.

With the invention configured as noted above, when using paper for which the printed code information does not bleed easily, it is possible to make the code information smaller. As a result, it is possible to keep the printed code information from standing out.

Also, with one aspect of the present invention, it is possible to apply the present invention not only to a printing control device, but also to a program or printing method that uses the present invention.

BRIEF DESCRIPTION OF THE DRAWINGS

Referring now to the attached drawings which form a part of this original disclosure.

DETAILED DESCRIPTION OF EMBODIMENTS

Figure 1:
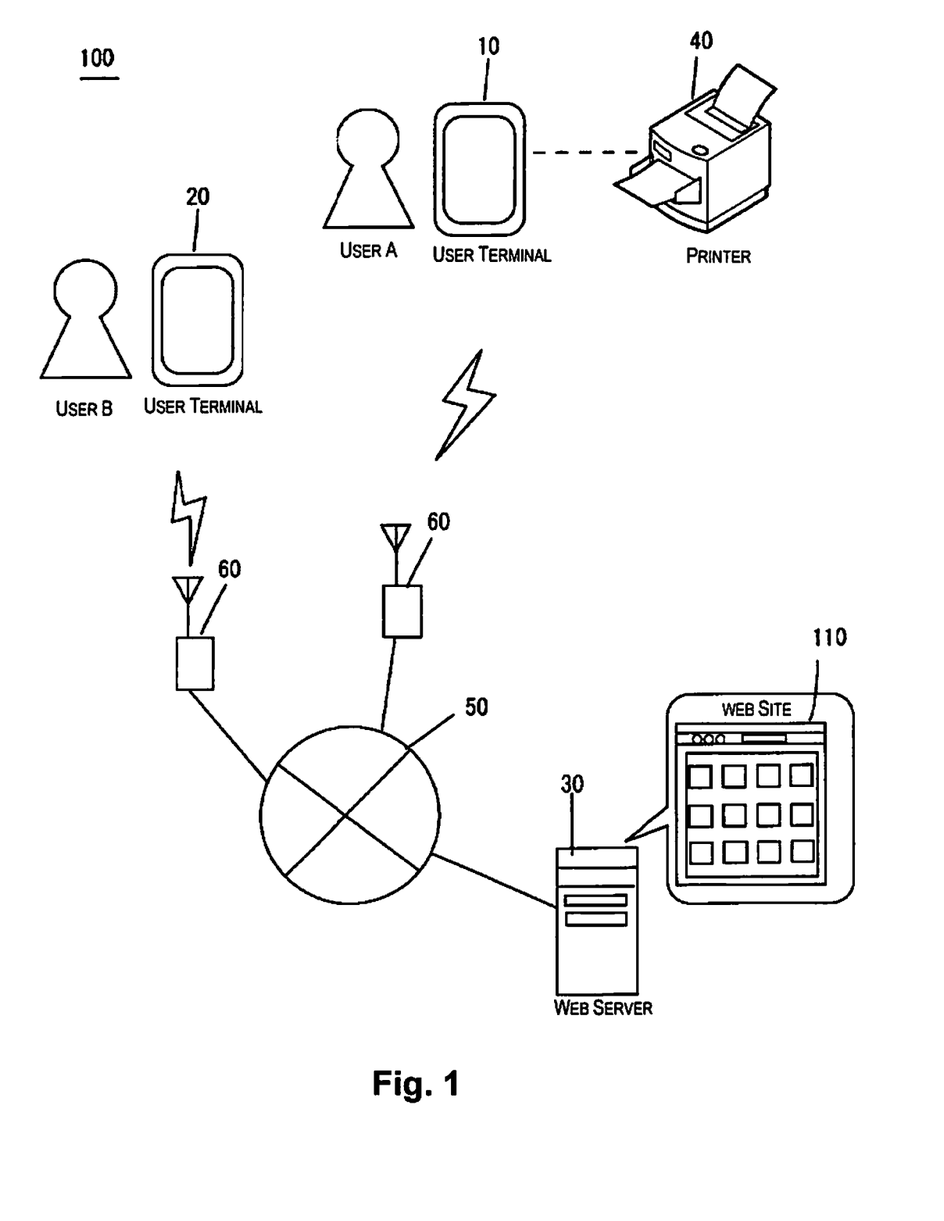
FIG. 1 is a drawing for describing a printing system.

Hereafter, we will describe embodiments of the present invention according to the following sequence.
1. First Embodiment
(1) Printing System Configuration:
(2) Web Site Configuration:
(3) Printing Method:
(4) Method for Using Printed Matter:
2. Second Embodiment:
3. Third Embodiment:
4. Other Embodiments:

1. First Embodiment (1) Printing System Configuration:

FIG. 1 is a drawing for describing a printing system.

A printing system 100 is equipped with user terminals 10 and 20, a web server 30, and a printer 40. Also, each device is connected to an internet 50 or to this internet 50 through a base station 60. With this embodiment, a printing control device is realized using the user terminals 10 and 20.

With the printing system 100 shown in FIG. 1, a user A or user B operates the user terminals 10 and 20, and it is possible to use a web site 110 managed by the web server 30. Using the service provided by the web site 110, it is possible to post images to the web server 30, to browse the posted images, and also to download the posted images. Also, the user terminal 10 is connected to be able to communicate with a printer 40. Because of that, the user is able to operate the user terminal 10 and send images downloaded from the web server 30 to the printer 40, and have them printed. Here, images include photographic images taken using a digital camera, text information, graphic images, and also animation.

Figure 2:
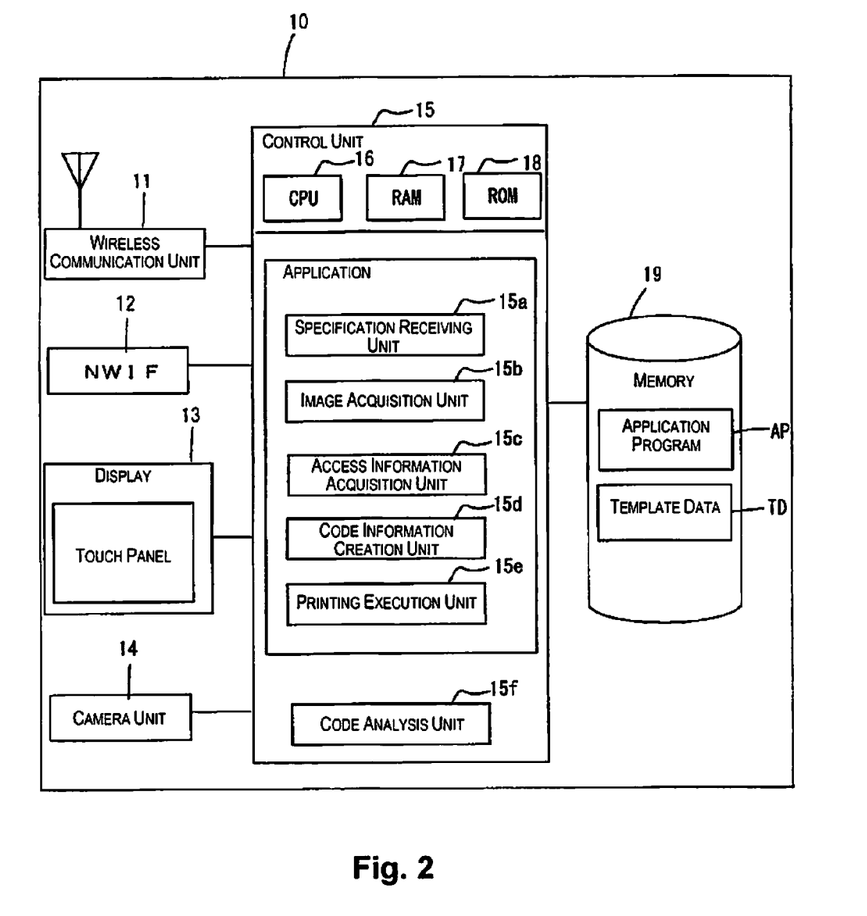
FIG. 2 is a block diagram for describing the constitution of a user terminal 10.

FIG. 2 is a block diagram for describing the constitution of the user terminal 10. The user terminal 10 is realized for example using a smart phone, a compact PC or the like. The user terminal 10 is equipped with a wireless communication unit 11, an NWIF 12, a display 13, a camera unit 14, a control unit 15, and a memory 19. The user terminal 10 can perform communication with the web server 30 and the printer 40 by having each unit driven by the control of the control unit 15.

The user terminal 20 has the same constitution as the user terminal 10, so a description will be omitted.

A wireless communication unit 11 performs wireless communication with the base station 60. Because of that, the user terminal 10 is connected to the interne 50 via the base station 60, and is able to use the services of the web site 110.

An NWIF 12 performs communication with the printer 40 using a network established with the printer 40. The network used by the NWIF 12 can be the internet 50, or can also be short-range wireless communication such as Bluetooth (registered trademark), infrared communication or the like.

The display 13 displays the web site 110 managed by the web server 30. Also, with this embodiment, the display 13 also functions as a touch panel for receiving contact operation from the user.

The camera unit (reading unit) 14 is equipped with an imaging device such as a CCD (Charge Coupled Device) or the like, digitizes a picture of the photographic subject, and generates a photograph (image). Photographs acquired through the camera unit 14 are recorded in the memory 19.

The memory 19 is constituted for example using flash memory such as SD memory or the like. Also, application programs AP and template data TD are recorded in the memory 19. By the control unit 15 (CPU 16) executing the application program AP, the user terminal 10 is able to download an image from the web site 110 and have this image printed on the printer 40.

The control unit 15 is equipped with the CPU 16, a RAM 17, and a ROM 18. The control unit 15 opens the application program AP recorded in the memory 19 in the RAM 17 and executes it, and thus is functionally equipped with a specification receiving unit 15a, an image acquisition unit 15b, an access information acquisition unit 15c, a code information creation unit 15d, and a printing execution unit 15e. Furthermore, the control unit 15 also functions as a code analysis unit 15f. The function of each unit will be described later.

Figure 3:
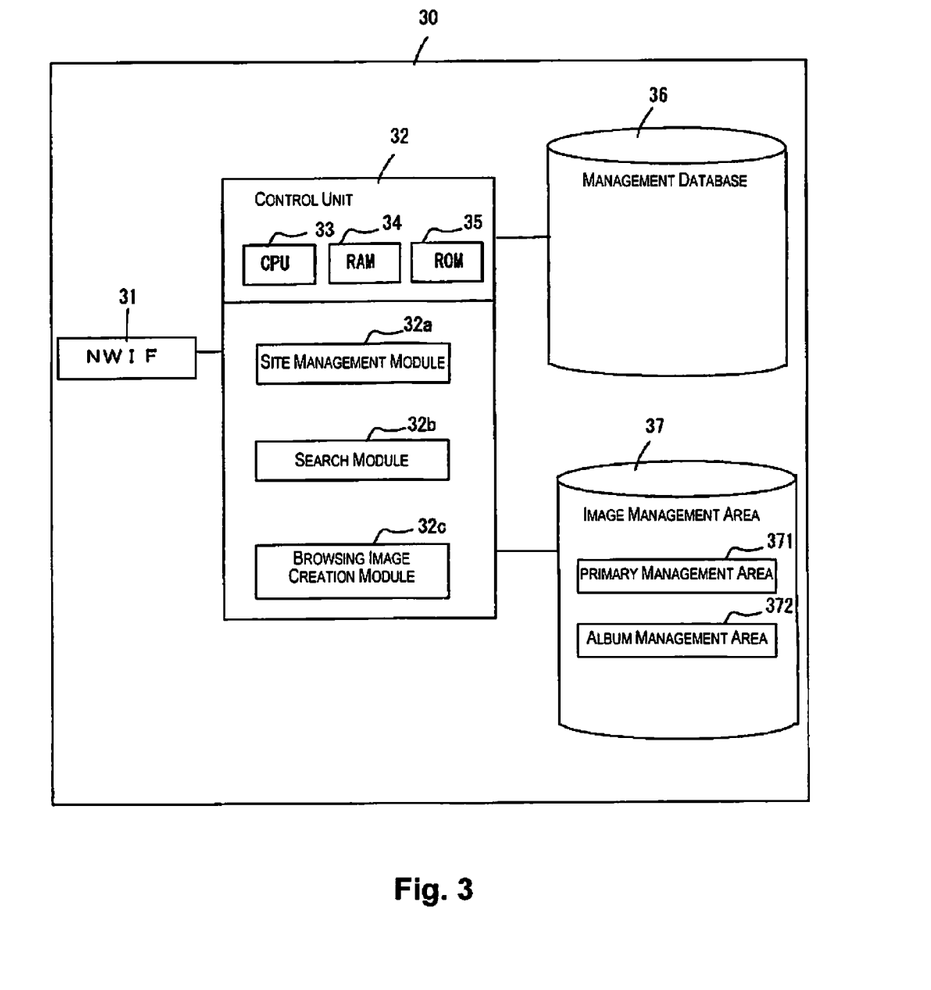
FIG. 3 is a block diagram for describing the constitution of a web server 30.

FIG. 3 is a block diagram for describing the constitution of the web server 30. The web server 30 is equipped with an NWIF 31, a control unit 32, a management database 36, and an image management area 37. With this embodiment, the web server 30 is constituted using one server, but it can also be realized using a combination of a plurality of servers having each function individually.

The management database 36 is constituted for example using an HDD (Hard Disk Drive) and data for building a regional database recorded in this HDD. The management database 36 has recorded a table for which each member of the web site 110 is associated with attribute information (image, URL) accompanying the web site service. Also, each table recorded in the management database 36 respectively undergoes association, and is made so it is possible to search for necessary attribute information relating to an image based on the account information of the member or the like. Because of that, the control unit 32 is able to search for the necessary information based on the tables recorded in the management database 36.

The image management area 37 has a plurality of images (photographs, comments) posted from a member of the web site 110 recorded. The image management area 37 is equipped with a primary management area 371 and an album management area 372. The primary management area 371 and the album management area 372 are formed in the image management area 37 for each member.

Of the images posted by the member, the primary management area 371 has recorded images published using a "default" browser page of an "album" which is a service of the web site 110. Also, of the images posted by the user, the album management area 372 has recorded images published using the browser page of the "album" which is a service of the web site 110.

The control unit 32 is equipped with a CPU 33, a RAM 34, and a ROM 35. The control unit 32 functionally has a site management module 32a, a search module 32b, and a browsing image creation module 32c by the CPU 33 executing programs recorded in the ROM 35.

When there has been a designated request from the user terminals 10 and 20 through the NWIF 31, the site management module 32a performs a response according to this request. The search module 32b searches for an image or image attribute information (URL or the like) based on the table recorded in the management database 36 from member account information or the like. The browsing image creation module 32c creates HTML (HyperText Markup Language) data for displaying the browser page based on the image acquired from the image management area 37. When there is a browser page request from the user terminal 10, the site management module 32a controls the NWIF 31 to download to the user terminal 10 the HTML data created by the browsing image creation module 32c.

The printer 40 performs printing on paper (matter to be printed) based on the print data generated by the user terminal 10. With this embodiment, the printer 40 is an inkjet printer for discharging ink from a print head. Of course, the printer 40 can also be a laser printer.

Figure 4A:
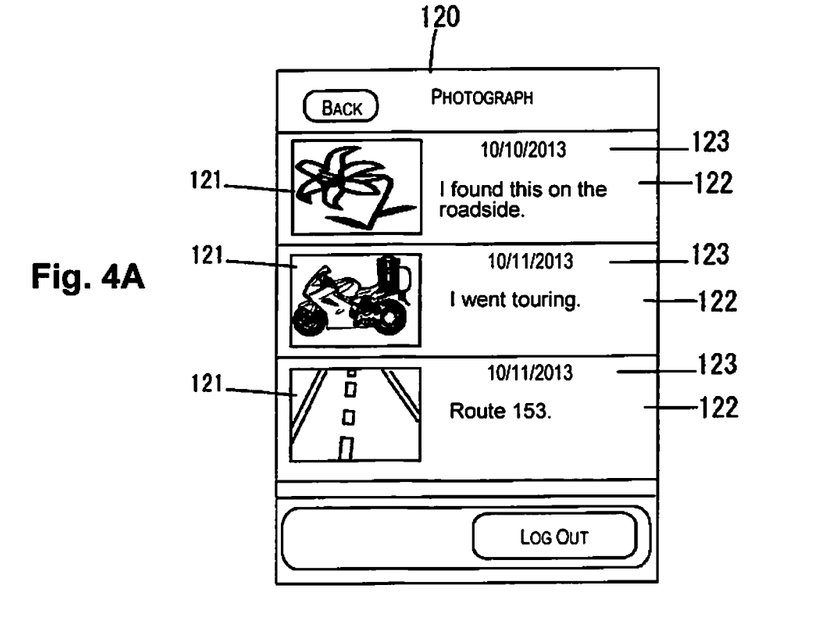
FIGS. 4A and 4B are drawings for describing a browser page (web page) provided by a web site 110.
Figure 4B:
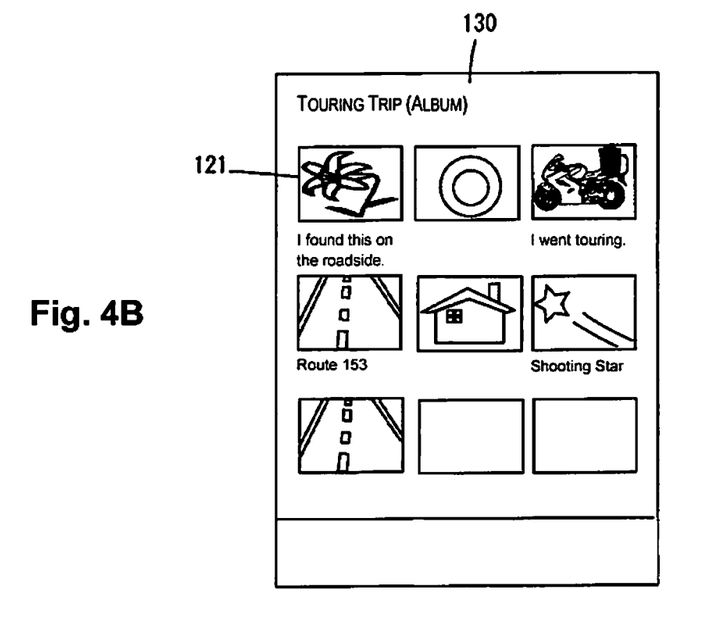

(2) Web Site Configuration:

FIGS. 4A and 4B are drawings for describing the browser page (web page) provided by the web site 110. Browser pages 120 and 130 shown in FIGS. 4A and 4B are web pages on which are published images posted by the user A who is a member of the web site 110.

FIG. 4A shows the default browser page (first service) 120. Also, FIG. 4B shows the browser page (second service) 130 when images are managed on an "album" which is a service of the web site 110. Hereafter, the default browser page is noted as default page 120, and the album browser page is also noted as album page 130.

Images posted by the user A (photographs, comments and the like) are individually managed on the default page 120 shown in FIG. 4A. For example, the default page 120 sequentially displays photographs 121 posted by the user A according to the posted date and time. Also, displayed near the photographs 121 posted by the user A are comments 122 written by the member together with posting of the photograph, and date and time 123 at which the photograph was posted. As described above, the images (photographs, comments and the like) displayed on the default page 120 are recorded in the primary management area 371 of the image management area 37. Hereafter, when "image" is noted, that includes photographs, comments, and the date and time.

Among the images posted on the default page 120, images selected by the user are displayed on the browser page 130 shown in FIG. 4B. This album page 130 is created when the user uses the "album" which is a service provided by the web site 110. As described above, the photographs 121 and the like displayed on the album page 130 are recorded in the album management area 372 of the image management area 37.

(3) Printing Method:

Next, we will describe a method of printing images posted on the web site 110 on the printer 40 using the user terminal 10 (printing method).

Figure 5A:
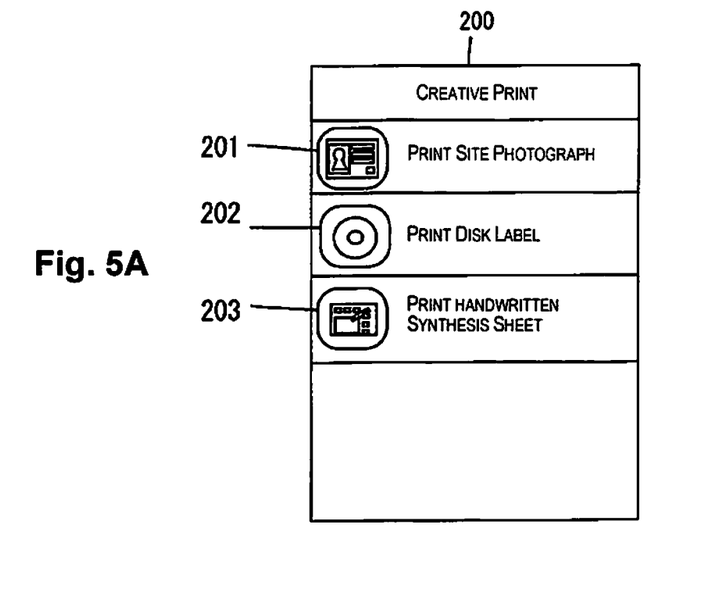
FIGS. 5A and 5B show a UI screen displayed on a display 13 of the user terminal 10.

FIGS. 5A and 5B shows a UI screen displayed on the display 13 of the user terminal 10. FIG. 5A shows the function selection screen 200 for selecting the application. With this function selection screen 200, an icon 201 indicating "site photograph printing," an icon 202 indicating "disk label printing," and an icon 203 indicating "handwritten synthetic sheet printing" are respectively displayed. Each icon 201 to 203 functions as an operating key for activating the respective applications. When the user operates the icon 201 indicating "site photograph printing" with the function selection screen 200 displayed on the display 13, the control unit 15 activates the application program AP.

Figure 5B:
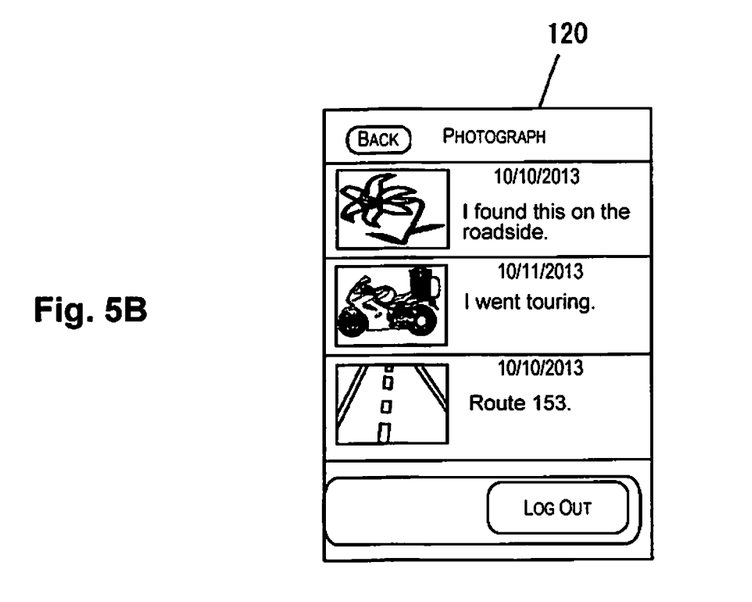

FIG. 5B shows the browser page displayed on the display 13 of the user terminal 10 using the application program AP. As an example, the browser page is the default page 120. With this browser page (default page 120), the user terminal 10 receives specification of an image for which to perform printing by the user. Then, the user terminal 10 creates print data PD for having printing executed on the printer 40 based on the specified image.

Figure 6:
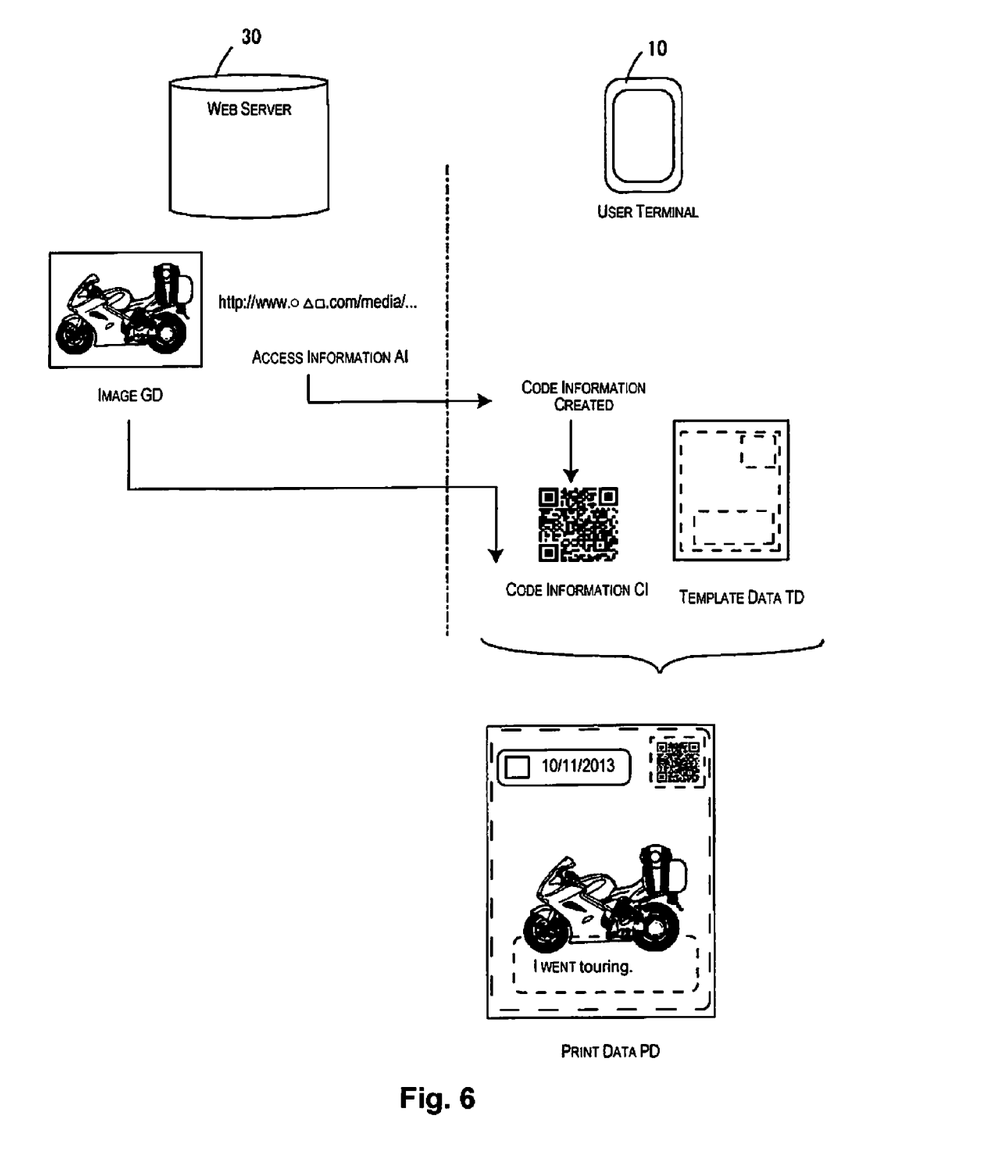
FIG. 6 is a drawing for describing print data PD created using the user terminal 10.

FIG. 6 is a drawing for describing the print data PD created using the user terminal 10. The print data PD is constituted, for example, from bit map data of each type of ink (cyan, magenta, yellow, black) used by the printer 40. The user terminal (printing execution unit 15e) 10 generates the print data PD based on the image GD acquired from the web server 30 and the URL (access information AI) of the web page on which this image GD is published. In specific terms, first, the user terminal (code information creation unit 15d) 10 generates code information CI based on the URL (access information AI) acquired from the web server 30. Next, the user terminal 10 synthesizes the image GD and the code information CI into template data TD and generates the print data PD.

Figure 7:
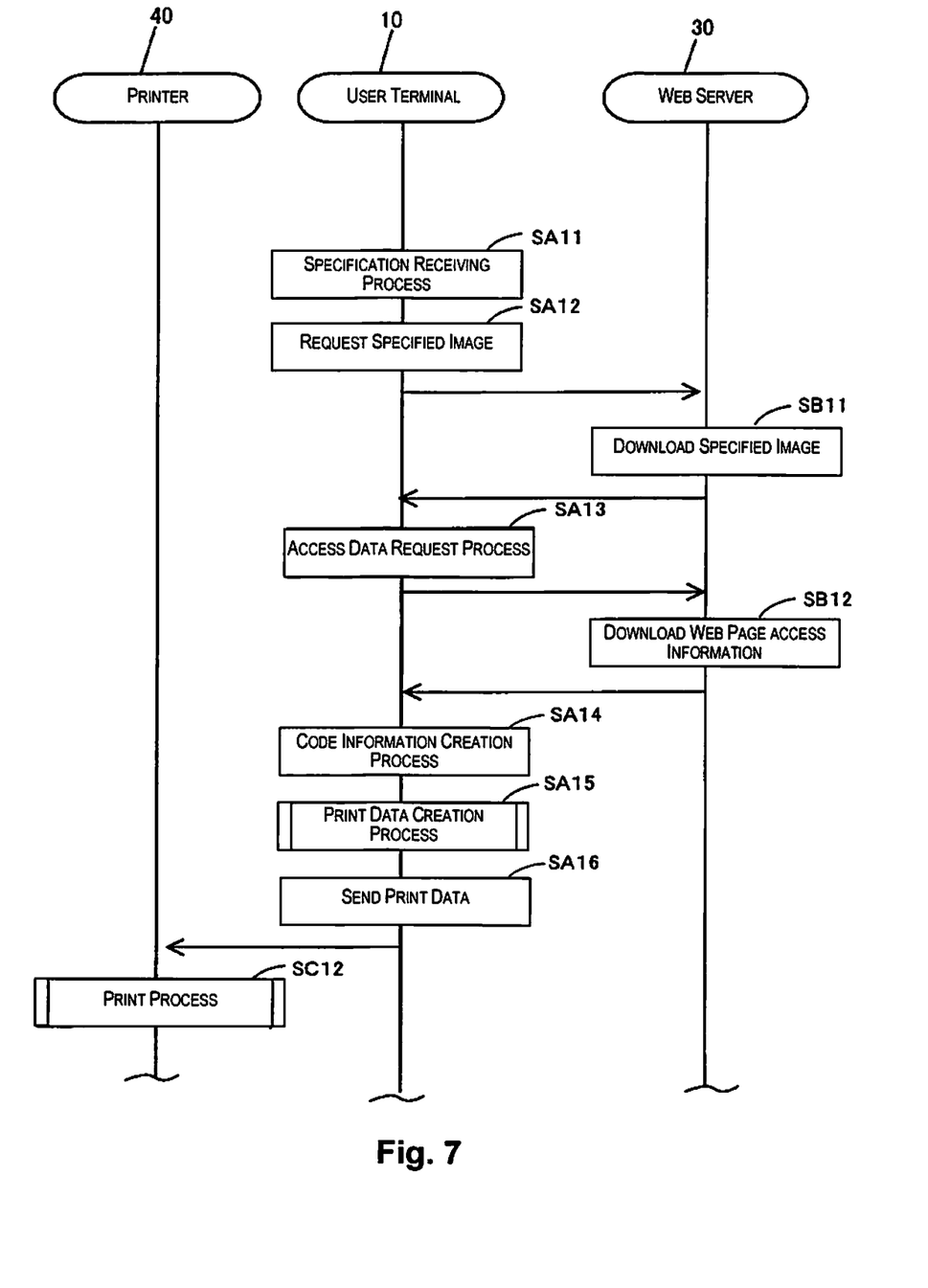
FIG. 7 is a sequence chart showing the process of the printing system 100.

FIG. 7 is a sequence chart showing the process with the printing system 100. By the process shown in FIG. 7, the print data PD shown in FIG. 6 is created, and printing is executed on the printer 40 based on this print data PD. The sequence shown in FIG. 7 is performed by execution of the application program AP using the user terminal 10.

At step SA11, the specification receiving unit 15a of the user terminal 10 receives specification of the image GD subject to printing on the browser page displayed on the display 13 (specification receiving means). For example, the user A performs specification of an image by touching a photograph displayed on the browser page displayed on the display 13 to select it.

At step SA12, the image acquisition unit 15b of the user terminal 10 makes a request to the web server 30 for the image GD specified by the user at step SA11 (image acquisition means). Communication between the user terminal 10 and the web server 30 is executed according to HTTP protocol.

At step SB11, when the site management module 32a of the web server 30 receives a request for the image GD, the image GD is downloaded to the user terminal 10 through the internet 50.

Next, at step SA13, the access information acquisition unit 15c of the user terminal 10 makes a request to the web server 30 for the URL (access information AI) of the web page on which the image GD requested at step SA12 is published (access information acquisition means). The URL of the web page request at this step can be the default page 120 or it can also be the album page 130. It can also be both the default page 120 and the album page 130. When the requested URL is the default page 120, the URL for each image recorded in the primary management area 371 is requested. When the requested URL is the album page 130, the URL displaying the album recorded in the album management area 372 is requested.

With the web server 30, when a request for the web page URL is received, the web page URL is downloaded through the internet 50 to the user terminal 10 (step SB12). As an example of a method for searching for a web page URL, the search module 32b searches for the URL of the web page on which the image GD was published based on the account information of the user A or the attribute information associated with the image GD downloaded at step SB12.

At step SA14, the code information CI is created based on the URL downloaded by the code information creation unit 15d of the user terminal 10 (code information creation means). As an example, the code information CI created by the code information creation unit 15d is a QR (Quick Response Code:) code (registered trademark) which is two dimensional graphic information. The QR code defines information using combinations of graphics arranged in the vertical direction and horizontal direction. The QR code creation method and the like is noted in Unexamined Patent Publication No. H11-306272, for example.

Also, as another example of code information created by the code information creation unit 15d, in addition to two dimensional code such as the QR code or the like, it is also possible to use a one dimensional bar code, or the URL itself as is.

At step SA15, the printing execution unit 15e of the user terminal 10 creates print data PD based on the image GD and the code information CI created at step SA14 (printing execution means).

Figure 8:
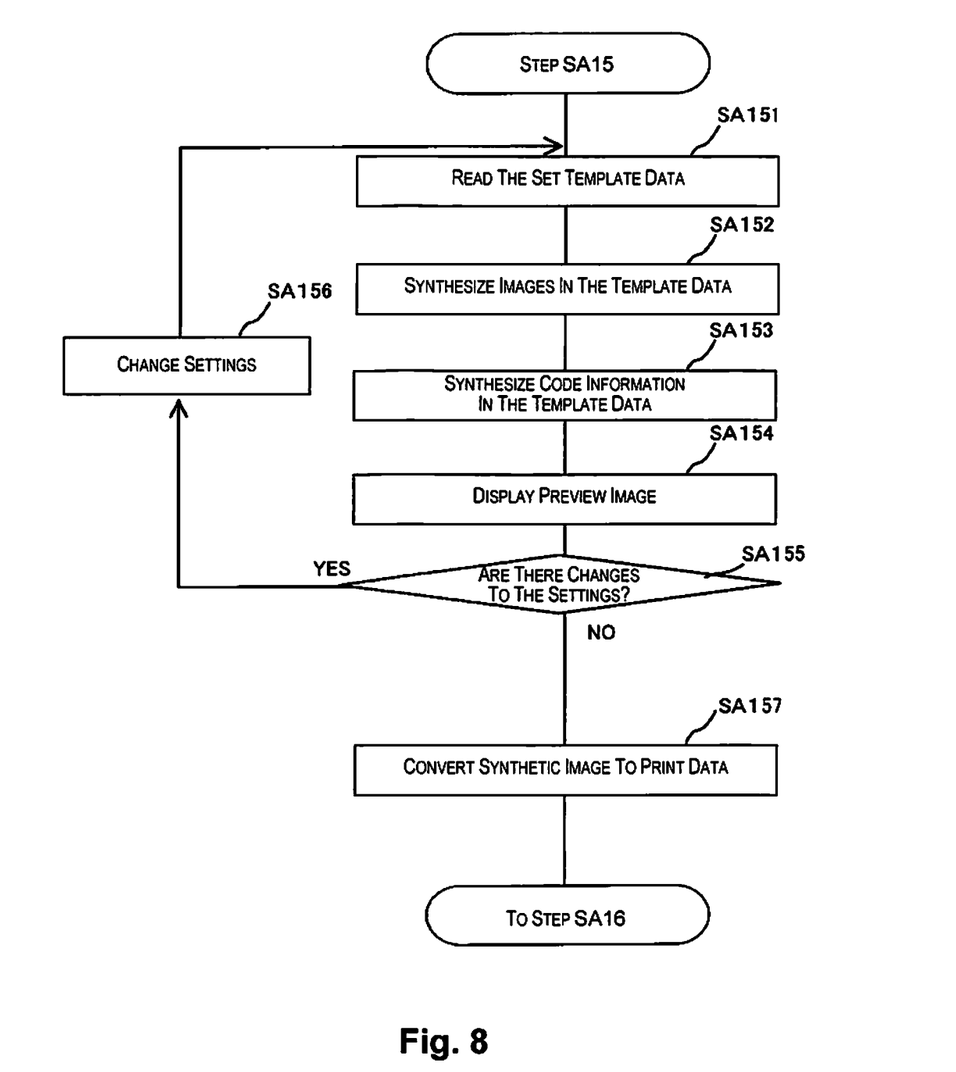
FIG. 8 is a flow chart showing the details of the process executed at step SA15 of FIG. 7.
Figure 9A:
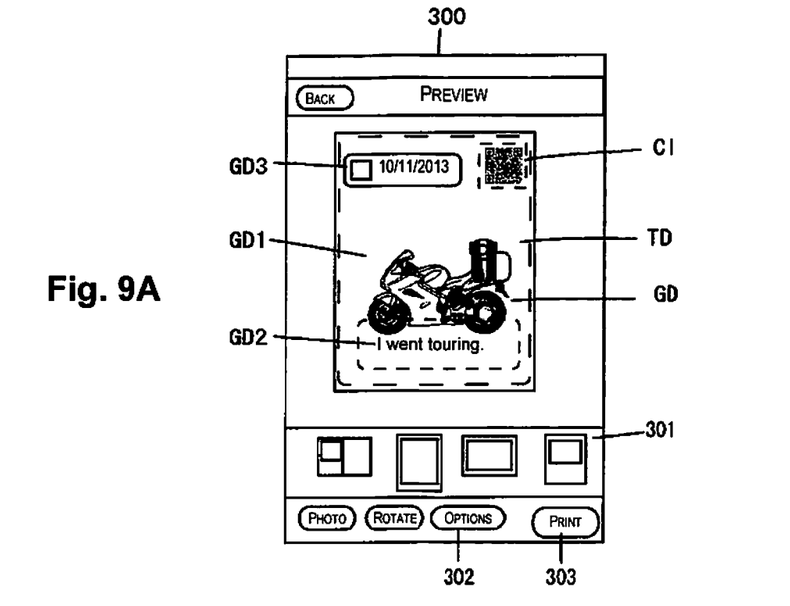
FIGS. 9A and 9B are drawings showing a preview image 300 displayed on the display 13 when the user terminal 10 is creating print data PD.
Figure 9B:
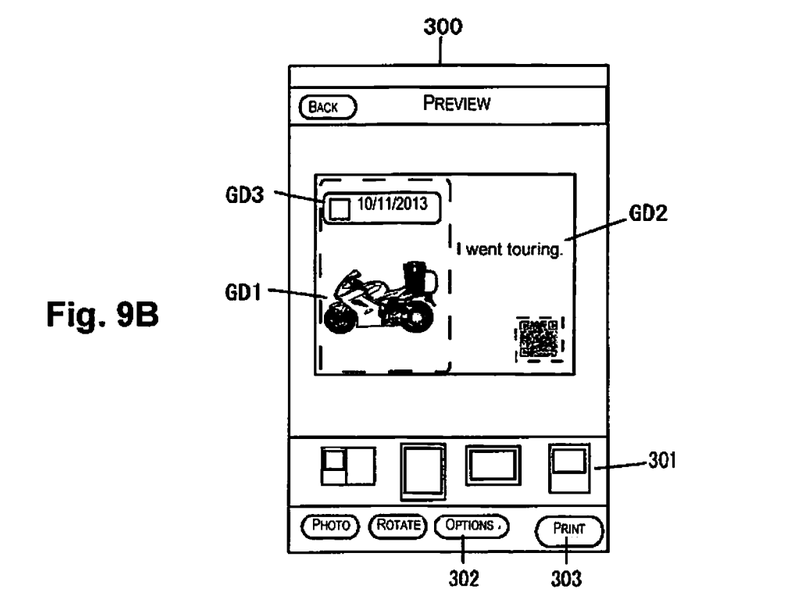

FIG. 8 is a flow chart showing in detail the process executed at step SA15 of FIG. 7. Also, FIGS. 9A and 9B are drawings showing a preview image 300 displayed on the display 13 when the user terminal 10 creates the print data PD.

At step SA151 of FIG. 8, the printing execution unit 15e reads the template data TD that has embedded the image GD and the code information CI from the memory 19. The template data TD is an image by which the printed matter background is formed.

At step SA152, the printing execution unit 15e synthesizes the image GD into the template data TD. Also, at step SA153, the printing execution unit 15e synthesizes the code information CI into the template data TD. The position at which the image GD and the code information CI are synthesized in the template data TD are predetermined according to the used template data TD.

At step SA154, the printing execution unit 15e displays a preview image (synthetic image). As shown in FIG. 9A, a preview image (synthetic image) 300 in which are embedded images (photograph GD1, comment GD2, date and time GD3), and code information CI at designated positions in the template data TD are displayed on the display 13. The user can change the template data TD or image configuration while viewing this preview image 300.

When various types of settings (template data TD, option settings) are changed by operation by the user (step SA155: Yes), the printing execution unit 15e changes the settings (SA156). Then, the process returns to step SA151, and the printing execution unit 15e creates the preview image 300 using the settings after the changes, and displays that (steps SA151 to SA154).

For example, in a state with the preview image 300 displayed, when the user operates the template icon 301 displayed under the preview image 300, the printing execution unit 15e changes the template data TD. FIGS. 9A and 9B show the preview image 300 for which the photograph GD1, the comment GD2, and the date and time GD3 are the same, and only the template data TD is changed. Specifically, with FIG. 9A, in contrast to the fact that the photograph GD1 and the comment GD2 are arranged aligned vertically, with FIG. 9B, the photograph GD1 and the comment GD2 are arranged aligned horizontally. Also, FIGS. 9A and 9B also have the code information CI in different positions.

Also, in a state with the preview image 300 displayed, when an option icon 302 displayed under the preview image 300 is operated, the printing execution unit 15e changes the preview image 300 configuration and displays it on an option screen 310. With the option screen 310, the setting of whether or not to include the code information CI in the print data PD and changing of the browser page at the link destination of the code information CI are performed.

Figure 10A:
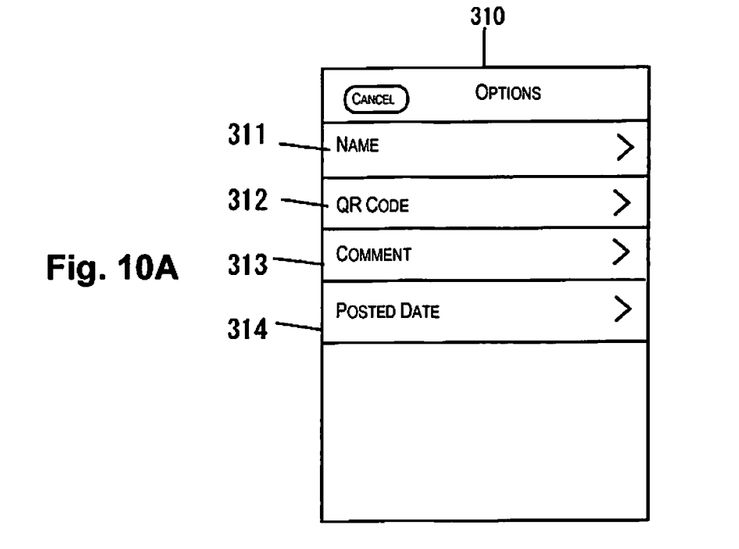
FIGS. 10A and 10B are drawings for describing an option screen 310 displayed on the display 13.

FIGS. 10A and 10B are drawings for describing the option screen 310 displayed on the display 13. With FIG. 10A, displayed are icons 311 to 314 for switching each option setting including "name," "QR code," "comment," and "posting date" as items of the option screen 310. The presence or absence of each data included in the synthetic image is switched by the user operating the icons 311 to 314.

Figure 10B:
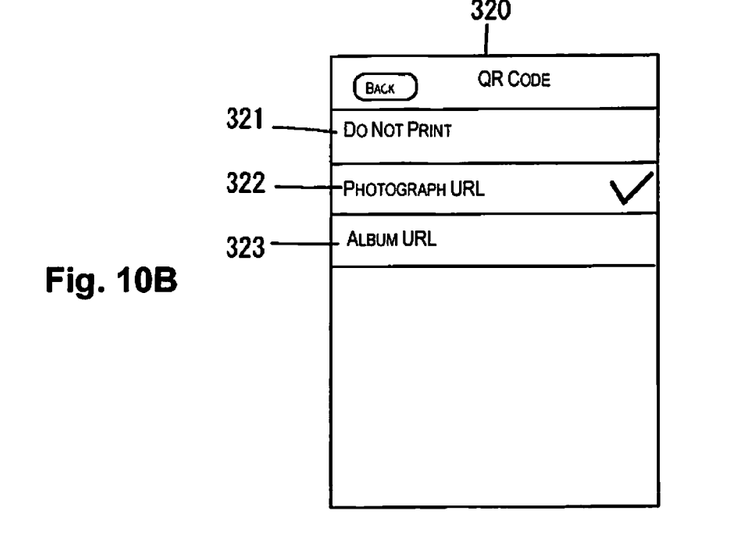

For example, by operating the icon 312 of the "QR code" shown in FIG. 10A, with a next screen 320 (FIG. 10B), icons 321 to 323 of "don't print," "photograph URL," and "album URL" are displayed on the display 13. When the user selects the icon 321 for "don't print," the printing execution unit 15e generates the print data PD that does not include the code information CI. When the user selects the icon 322 for "photograph URL," the printing execution unit 15e uses an individual URL for the image for which the code information CI link destination will be subject to printing. Specifically, the image URL of the default page 120 is set for the code information CI. Then, when the user selects the icon 323 for the "album URL," the printing execution unit 15e sets the code information CI link destination to the URL of the album page 130. Specifically, the URL of the album page 130 containing the image is set for the code information CI.

Meanwhile, if there are no various types of changes (step SA155: No), the process advances to step SA157, and the printing execution unit 15e generates the print data PD. For example, by the user operating the icon 303 for executing printing, the printing execution unit 15e converts the synthetic image to bit map data corresponding to each color ink used by the printer 40, and generates the print data PD.

Returning to FIG. 7, at step SA16, the printing execution unit 15e of the user terminal 10 sends the print data PD to the printer 40. In specific terms, the printing execution unit 15e controls the wireless communication unit 11 and establishes wireless communication with the printer 40. Then, using this wireless communication, the print data PD is sent to the printer 40.

With the printer 40, when the print data PD is received, the print data PD is analyzed and printing on paper is performed (step SC1).

(4) Method for Using Printed Matter:

Next, we will describe the method of using printed matter printed by the printer 40.

Figure 11:
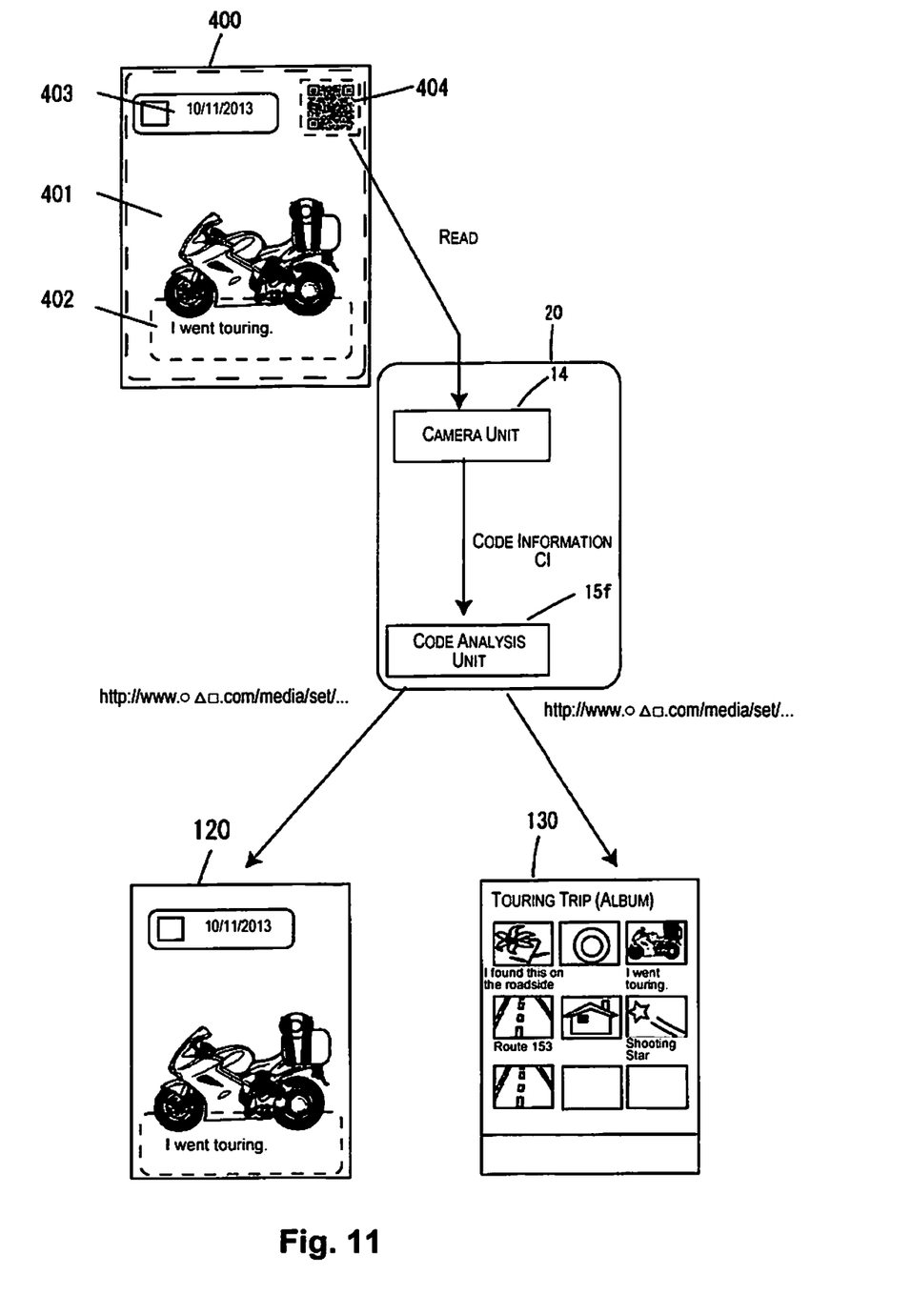
FIG. 11 is a drawing for describing a method of using printed matter printed using a printer 40.

FIG. 11 is a drawing for describing the method of using the printed matter printed by the printer 40. With FIG. 11, using a postcard as the paper, a printing area 400 on which printed matter is printed on the face of the postcard is formed. Also, downloaded images (photograph 401, comment 402, date and time 403) downloaded from the web server 30 as the printing subject are respectively printed on the printing area 400. Furthermore, in the upper right side of the printing area 400 in the drawing, a QR code 404 corresponding to the code information CI is printed.

First, the user B (FIG. 1) who received the postcard (printed matter) 400 does imaging of the QR code 404 using the camera unit 14 of the user terminal 20, and fetches the code information CI into the user terminal 20. On the interior of the user terminal 20, the fetched code information CI is analyzed by the code analysis unit 15f, and the URL (access information AI) is restored. Then, the code analysis unit 15f makes a request to the web server 30 for downloading of the web site 110 (browser page) linked by the restored URL.

Because of that, when the URL contained in the code information CI corresponds to the default page 120, only the specified image is displayed on the display 13 of the user terminal 20. Meanwhile, when the URL contained in the code information CI corresponds to the album page 130, as shown in FIG. 11, the album page 130 in which the specified image is contained is displayed on the display 13 of the user terminal 20.

As described above, with this invention, when printing an image published on a web site with a printer, the code information for accessing the web page on which this image is published is printed. Because of that, it is possible for the user to easily identify the web site on which the image is published based on this code information.

Also, when the web site provides a first service that publishes photos individually as well as a second service that does batch management of a plurality of images including the image as well, it is possible to set the printed code information according to type of service by which the image is published.

Also, because it is possible to access the web page on which the image is published by reading the code information, the user is able to easily browse the web page on which the image is published.

2. Second Embodiment

Figure 12A:
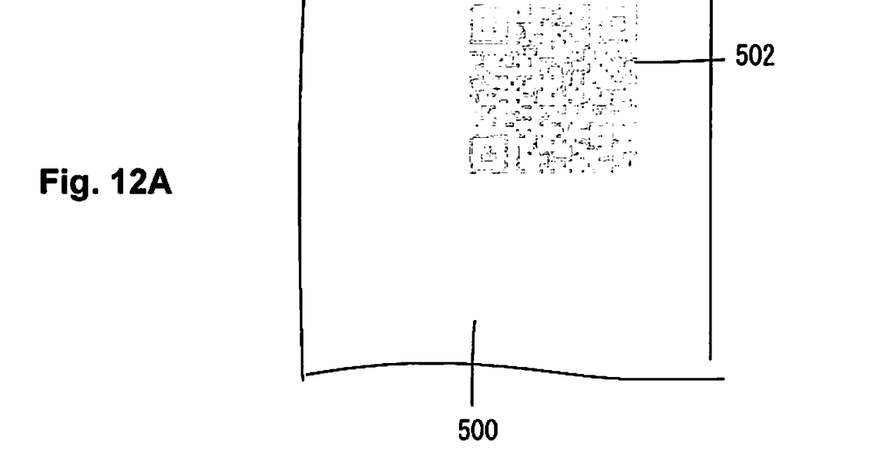
FIGS. 12A and 12B are drawings showing the density of code information changed according to the type of matter to be printed.
Figure 12B:
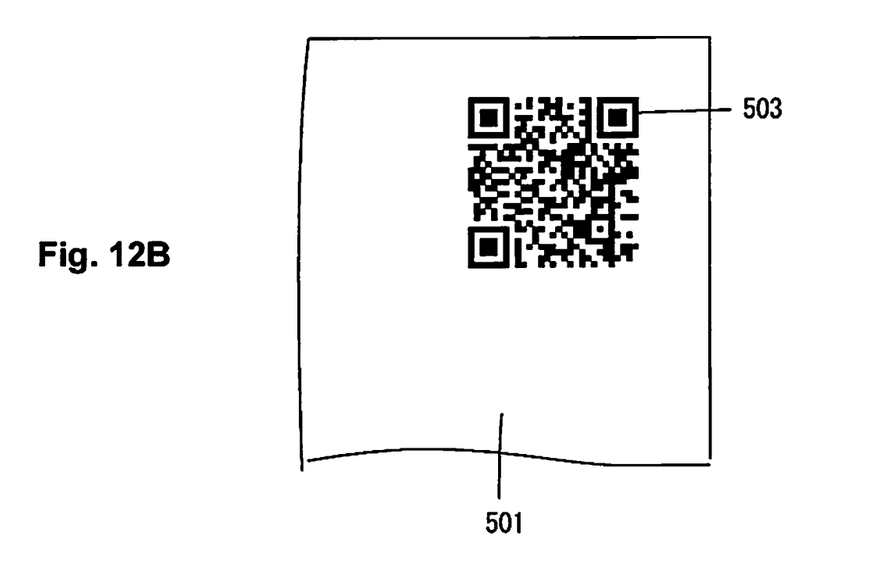

It is also possible to be an item for which the density of the code information printed on the printed matter changes according to the paper type. FIGS. 12A and 12B are drawings showing the density of the code information CI changed according to the paper type. FIG. 12A is a drawing showing the QR code 502 printed on non-coated paper (first paper) 500 as the paper. Also, FIG. 12B is a drawing showing the QR code 503 printed on coated paper (second paper) 501 as the paper. Here, the non-coated paper 500 bleeds more easily than the coated paper 501.

With this second embodiment, the user terminal 10 is able to set the paper type (coated paper, non-coated paper) using the option screen 310 displayed on the display 13. The printing execution unit 15e generates the print data PD such that when the paper set with the option screen 310 is the non-coated paper 500, the density of the ink for printing the QR code 502 is lower than the default density (FIG. 12A). On the other hand, the printing execution unit 15e makes the density of the ink for printing the QR code 503 the default density when the paper set with the option screen 310 is the coated paper 501 (FIG. 12B).

With the constitution above, even when the paper on which the image is printed bleeds easily, it is possible to reduce ink bleeding. As a result, it is possible to suppress the occurrence of reading errors due to the code information bleeding.

3. Third Embodiment

With this third embodiment, the size of the code information CI printed on the paper is changed according to how easily the paper on which the code information CI is printed bleeds. In specific terms, the user terminal 10 is able to set paper types using the option screen 310. Also, recorded in the memory 19 are a plurality of template data TD for which the area in which the code information CI is embedded differs according to the type of paper. Also, when the type of paper set does not bleed easily, the printing execution unit 15e uses template data TD for which the area in which the code information CI is embedded is small.

With the constitution noted above, compared to when printing on paper (fourth paper) that is non-coated for which bleeding occurs easily, it is possible to make the code information CI size smaller when printing the code information CI on coated paper or the like for which bleeding does not occur easily (third paper). Because of that, when using paper for which bleeding does not occur easily, it is possible to make it so that the code information CI formed on the printed matter does not stand out easily. On the other hand, the printing execution unit 15e can also make the size of the code information printed on the paper large when a paper type that bleeds easily is set.

4. Other Embodiments

The present invention has various embodiments.

The item that generates the print data PD can also be other than the user terminal 10. For example, the user terminal 10 has the image GD and the access information AI recorded by the web server 30 downloaded to the printer 40. Also, the printer 40 generates the code information CI from the access information AI. Then, the printer 40 generates the print data PD based on the image GD and the code information CI. Furthermore, it is possible to be an item with which, with the example noted above by which the printer 40 generates the print data PD, after the user terminal 10 generates the code information CI from the access information AI, it sends the generated code information CU to the printer 40.

It is also possible to be an item for which the color of the code information CI printed on the matter to be printed is changed using the option screen 310 displayed on the display 13 of the user terminal 10.

It goes without saying that the present invention is not limited to the embodiments noted above.

Specifically, it is possible to change as appropriate the combinations of members and constitutions and the like that can be mutually interchanged disclosed in the embodiments above, and to apply those.

It is also possible to interchange as appropriate members and constitutions that are known technology that are mutually interchangeable with the members and constitutions and the like disclosed in the embodiments noted above, and to change combinations thereof and apply those.

It is also possible to change as appropriate members and constitutions and the like disclosed in the embodiments noted above that would be known by a person skilled in the art based on known technology or the like with members and constitutions and the like that can be assumed to be substitutes, or to change combinations thereof and apply those.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing control device accessible to a server for managing a web site through a network, the printing control device including a CPU that executes applications comprising:
   a specification receiving unit configured to receive specification of an image published on the web site;
   an image acquisition unit configured to acquire a specified image through the server;
   an access information acquisition unit configured to acquire access information for accessing a web page on which the image is published on the web site;
   a code information creation unit configured to create code information expressing the access information using text or an image, and
   a printing execution unit configured to make a printer print a synthetic image in which the acquired image and the created code information are included, wherein
   the web site is configured to provide a first service that publishes the image individually, and a second service that publishes a plurality of images as an album including the images,
   the specification receiving unit is further configured to receive specification of a selection of the first service and the second service, and
   the access information acquisition unit is further configured to acquire the access information on a selected service of the first service and the second service.

2. The printing control device according to claim 1, further comprising
   a reading unit configured to read the code information, and
   a code analysis unit configured to restore the access information based on read code information, and configured to display the web page on which the image is published.

3. The printing control device according to claim 1, wherein
   the printing execution unit is configured to set a density of the code information printed on a first paper to be lower than a density of the code information printed on a second paper for which ink does not bleed as easily as the first paper.

4. The printing control device according to claim 1, wherein
   the printing execution unit is configured to set a size of the code information printed on a third paper to be smaller than a size of the code information printed on a fourth paper for which ink bleeds easier than with the third paper.

5. The printing control device according to claim 1, wherein
   the access information acquisition unit is further configured to acquire the access information based on at least one of account information of a user or attribute information associated with the image.

6. A non-transitory computer readable medium storing a program for accessing a server for managing a web site through a network, the program causing a printing control device to execute processing that includes:
   receiving specification of an image published on the web site;
   acquiring a specified image through the server;
   acquiring access information for accessing a web page on which an image is published on the web site;
   creating code information expressing the access information using text or an image; and
   making a printer print a synthetic image including an acquired image and the created code information, wherein
   the web site is configured to provide a first service that publishes the image individually, and a second service that publishes a plurality of images as an album including the images,
   the receiving specification includes receiving specification of a selection of the first service and the second service, and
   the acquiring access information includes acquiring the access information on a selected service of the first service and the second service.

7. A printing method for accessing a server for managing a web site through a network, and for making a printer print an image managed on the server, the printing method comprising:
   receiving specification of an image published on the web site;
   acquiring a specified image through the server;
   acquiring access information for accessing a web page on which the image is published on the web site;
   creating code information expressing the access information using text or an image; and
   making a printer print a synthetic image including the acquired image and the created code information, wherein
   the web site is configured to provide a first service that publishes the image individually, and a second service that publishes a plurality of images as an album including the images,
   the receiving specification includes receiving specification of a selection of the first service and the second service, and
   the acquiring access information includes acquiring the access information on a selected service of the first service and the second service.

* * * * *